United States Patent
McGlone et al.

(10) Patent No.: US 9,521,829 B2
(45) Date of Patent: *Dec. 20, 2016

(54) LIVESTOCK IDENTIFICATION AND MONITORING

(71) Applicant: Animal Biotech LLC, Dallas, TX (US)

(72) Inventors: John J. McGlone, Lubbock, TX (US); Brian Nutter, Lubbock, TX (US); Sunanda Mitra, Lubbock, TX (US); Ranadip Pal, Lubbock, TX (US)

(73) Assignee: Animal Biotech LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,585

(22) Filed: Mar. 27, 2015

(65) Prior Publication Data

US 2015/0289478 A1    Oct. 15, 2015

Related U.S. Application Data

(63) Continuation of application No. 14/323,268, filed on Jul. 3, 2014, now Pat. No. 9,084,411.

(Continued)

(51) Int. Cl.
*G06K 9/00* (2006.01)
*A01K 11/00* (2006.01)
*A01K 29/00* (2006.01)

(52) U.S. Cl.
CPC ............. *A01K 11/006* (2013.01); *A01K 29/00* (2013.01)

(58) Field of Classification Search
CPC ........ A01K 11/006; A01K 29/00; G06K 9/48;
G06K 9/6209; G06K 9/6214; G06T 2207/10004; G06T 2207/30128; G06T 7/0004; G06T 7/0012; G06T 7/0083; G06T 7/0089

(Continued)

(56) References Cited

U.S. PATENT DOCUMENTS 7,670,292 B2 * 3/2010 Haynes .................... A61B 8/08
                                                    119/174
7,681,527 B2 * 3/2010 Pratt ...................... A01K 29/00
                                                    119/174

(Continued)

OTHER PUBLICATIONS

Jaclyn Elyse Love, "Video Imaging for Real-Time Performance Monitoring of Growing-Finishing Pigs", A Thesis presented to The University of Guelph, Aug. 2012, 115 pages.

*Primary Examiner* — Ali Bayat
(74) *Attorney, Agent, or Firm* — David W. Carstens; Shaukat A. Karjeker; Carstens & Cahoon, LLP

(57) ABSTRACT

A livestock identification system/method configured to identify individual animals from a pool of livestock is disclosed. The system/method utilizes images of individual animals and determines the identity of a specific animal based on markers extracted from the image of the animal. These markers may then be used to characterize the state of the animal as to weight, health, and other parameters. The system is configured to log these parameters in a temporal database that may be used to determine historical activity of the animal, including but not limited to activity relating to food and/or fluid intake. This historical record in conjunction with analysis of the animal state parameters is used to determine the animal health status and may also be used to determine whether the animal is ready for harvesting.

26 Claims, 20 Drawing Sheets

Related U.S. Application Data

(60) Provisional application No. 61/978,093, filed on Apr. 10, 2014.

(58) Field of Classification Search
USPC .......................................................... 382/110
See application file for complete search history.

(56) References Cited

U.S. PATENT DOCUMENTS

| | | | | |
|---|---|---|---|---|
| 2007/0110281 A1* | 5/2007 | Jurk | .................. | G06F 17/30244 |
| | | | | 382/110 |
| 2012/0265702 A1* | 10/2012 | Maher | .................... | G06Q 10/10 |
| | | | | 705/317 |
| 2012/0275659 A1* | 11/2012 | Gomas | .................. | G06T 7/0083 |
| | | | | 382/110 |
| 2013/0322699 A1* | 12/2013 | Spicola, Sr. | ............. | G01G 9/00 |
| | | | | 382/110 |
| 2014/0029808 A1* | 1/2014 | Lee | .................... | G06K 9/00362 |
| | | | | 382/110 |

\* cited by examiner

FIG. 18C

LIVESTOCK IDENTIFICATION AND MONITORING

CROSS REFERENCE TO RELATED APPLICATIONS

This application is a continuation of U.S. application Ser. No. 14/323,268 filed Jul. 3, 2014, which was a non-provisional application of U.S. Provisional Patent Application Ser. No. 61/978,093, entitled "Livestock Identification System and Method," filed Apr. 10, 2014, the technical disclosures of which are hereby incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to livestock identification systems/methods and specifically addresses application contexts in which the identity, body weight, and health status of livestock and their viability for harvest must be determined.

BACKGROUND OF THE INVENTION

Overview

The prior art technology relates to the field of animal husbandry and the efficient raising of livestock, such as pigs, cattle, chickens, and llamas. Such livestock are raised to produce commodities such as food, hides, bones, bristles, and related products.

Farm labor costs represent only 3.2% of the cost to produce a market pig from weaning, which means this is a very low allocation of production expense to labor. This results in very little attention from human caretakers being given to individual pigs or other livestock animals. Thus if an individual pig develops health needs or becomes sick it may not be noticed before other animals are infected or the sick individual pig dies. Alternatively, there may be a time lag before farm management becomes aware that pigs within the population are reaching marketable weight and should be separated and sent to market.

Using the systems presented in this invention, the eigenface algorithm can be used to estimate individual pig identify. Weekly pictures and body weights of each pig can be taken. Each face image in a training set represents a linear combination of the principal components of the distribution of faces. These principal components are called the eigenvectors. These eigenvectors characterize the variation in faces from statistical computation of the covariance matrix of a set of the face images involved. The eigenface algorithm sums the pixels in an image to generate a weighting vector that is unique (with some variation) for an individual animal.

This invention enables farm managers to identify animals, assess their health, and decide whether they are suitable for sale.

Deficiencies in the Prior Art

The prior art suffers from the following deficiencies:
It is very difficult and inefficient for farm workers and managers to assess the health needs of individual animals when large-scale commercial farms have thousands, if not millions of individual animals under their care.
Currently workers assess animal health by observation and integrating various factors such as appearance, interaction with other animals, movements, sounds, and social behavior. It is believed that animals sometimes pretend to be healthy because ancient instinct compels them to avoid looking sick or weak since predators normally attacked such animals.
Average workers can only spend a few seconds with any individual animal within large populations. This short time frame leads to a lack of relevant and real-time information about individual animals such that unhealthy animals are not identified in time to effect treatment and avoid culling.
Healthy and marketable animals are not always immediately identified when they attain the ideal weight dictated by market conditions. Managers need to respond to market conditions to sell healthy and properly-sized livestock animals with real-time population information.
Current methods make it difficult and inefficient to create accurate and useful records on individual livestock animals to support management decisions on veterinary care or marketability. Unhealthy animals may not be identified and may infect other animals before they die in the pen among healthy animals. The death may create a potential for further infection.

OBJECTIVES OF THE INVENTION

Accordingly, the objectives of the present invention are (among others) to circumvent the deficiencies in the prior art and include but are not limited to the following:
(1) Provide for a livestock identification system and method that allows for accurate identification of individual animals.
(2) Provide for a livestock identification system and method that allows for collection of data about each individual animal in the population including, but not limited to, identification, water intake amount, body weight, and surface and body core temperature. Health status and marketability status will be derived from this information.
(3) Provide for a livestock identification system and method that allows for estimation of body weight using facial parameters, including facial dimensions.

(4) Provide for a livestock identification system and method that allows for estimation of health status using body weight, water intake and body temperature data.
(5) Provide for a livestock identification system and method that allows for estimation of marketability using body weight and health status determinations.

While these objectives should not be understood to limit the teachings of the present inventions, in general these objectives are achieved in part or in whole by the disclosed inventions that are discussed in the following sections. One skilled in the art will no doubt be able to select aspects of the present inventions as disclosed to affect any combination of the objectives described above.

BRIEF SUMMARY OF THE INVENTION

A system and method for rapid and accurate identification of livestock animals for the purpose of determining the identity, health, and harvesting viability of the livestock animal is disclosed. Using the system and methods presented in exemplary embodiments herein, individual animal identity is estimated using the eigenface algorithm. Weekly pictures and body weights of each animal can be taken. Each face image in a training set represents a linear combination of the principal components of the distribution of faces. These principal components are called the eigenvectors. By a statistical computation of the covariance matrix of the eigenvectors, the variations in faces of animals in the population are determined. The eigenface algorithm sums the pixels in an image to generate an eigenface weighting vector that is unique (with some statistical variation) for an individual animal.

In terms of identification, the eigenface weight vector is calculated for each animal face image and tested to determine if it could identify the individual animal with a commercially acceptable level of probability. If the tested image is correctly recognized as a match, it is called a "direct hit."

In terms of weight estimation, in an exemplary embodiment animal body weight is correlated to the mean distance in pixels between eyes for each animal. For instance, pig faces grow in proportion to body weight. Thus inter-eye distance correlates reasonably well with body weight. Over a range of body weights from birth through 100 kg, an exponential curve where y=pixels and x=kilograms, for example: the equation $y=71.97*x^{1/3}$ describes the relationship between weight and pixel distance between eyes for a specific imaging geometry. For the narrow weight range of 5 to 42 kg, a linear model is used, for example the equation $y=2.915*x+129.5$ describes the relationship between weight and pixel distance between eyes for the same imaging geometry. Different imaging geometries lead to different regression curves.

In terms of a specific numerical non-limiting example presented for illustrative purposes, consider the situation of starting with four training faces, exemplified in FIG. 18A.

Three (3) eigenfaces exemplified in FIG. 18B are calculated based on the eigenface algorithm. (The number of eigenfaces is usually smaller than number of faces in the training set).

After computing the weight vectors of the input images, the input images can be reconstructed as exemplified in FIG. 18C.

From FIG. 18C, weight vector of subject one $\Omega_1=[-1.839, 3.899, 0.861]$.

Weight vector of subject two $\Omega_2=[-2.717, -2.901, 1.816]$.

Weight vector of subject three $\Omega_3=[-1.857, -0.688, -2.863]$.

Weight vector of subject four $\Omega_4=[6.415, -0.310, 0.186]$.

Another image of subject 2, exemplified in FIG. 18D is used as a test image.

The weight vector of new image is calculated $\Omega=[1.0774, -2.4111, 0.1922]$.

To identify the new image, we need to compare new weight vector with the four weight vectors and find out the one with minimum error, where error is defined as $e_i$.

$$e_i=\|\Omega-\Omega_i\|$$

If the minimum error is smaller than the threshold, it is called a match. Otherwise, it is unknown.

Error is calculated $e=[6.9840\ 4.1565\ 4.5741\ 5.7360]$. $e_2$ is the smallest, which means the new image should most likely belong to subject 2.

The reconstructed image shown in FIG. 18E is based on the training set. Generally speaking, the more images per subject there are in the training set, the greater the probability and degree of confidence in any prediction.

BRIEF DESCRIPTION OF THE DRAWINGS

For a fuller understanding of the advantages provided by the technology, reference should be made to the following detailed description together with the accompanying drawings wherein.

DESCRIPTION OF EXEMPLARY EMBODIMENTS

Figure 1:
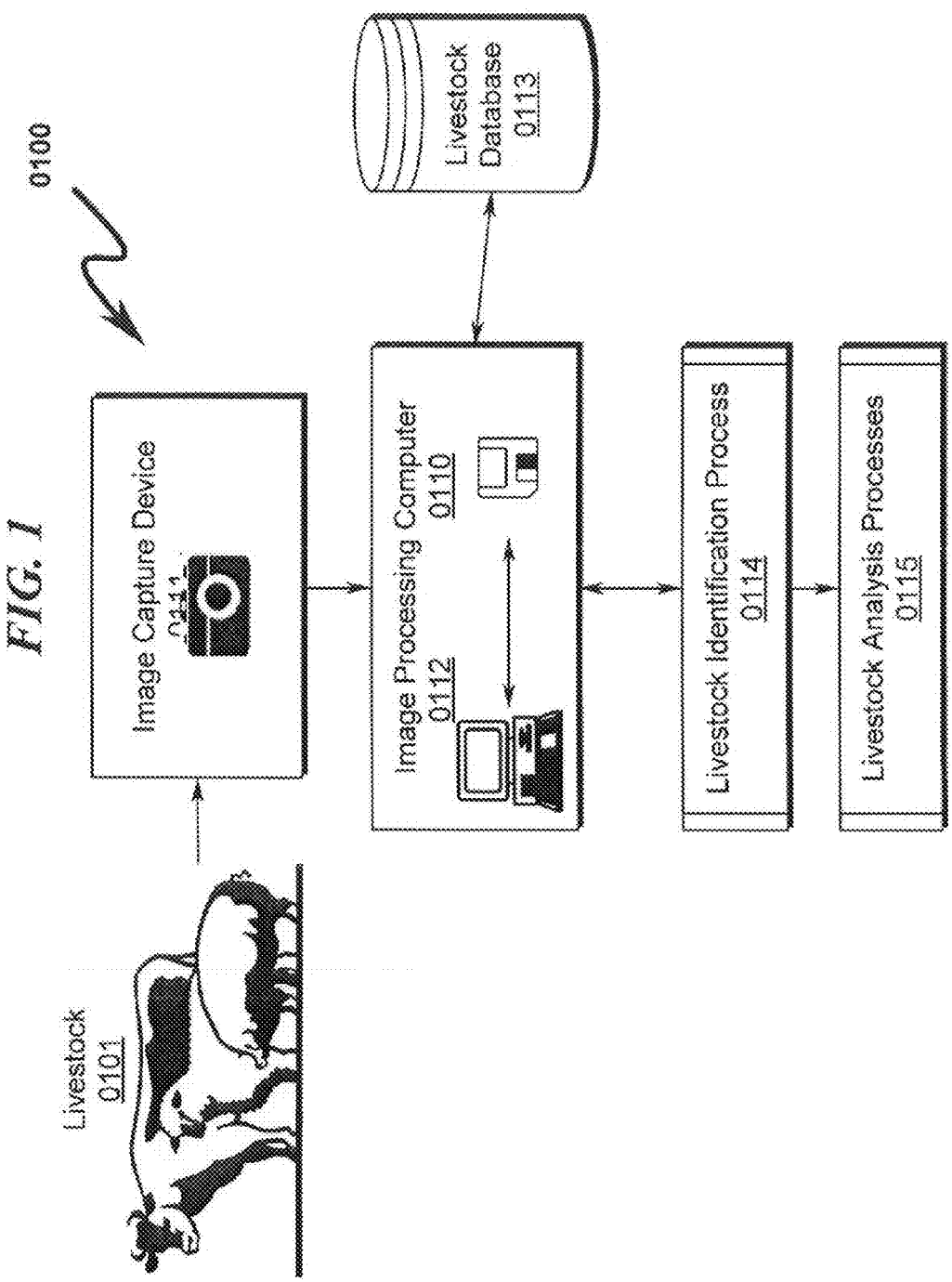
FIG. 1 illustrates a system block diagram depicting a generalized system overview of an exemplary embodiment of the present invention.

While this invention is susceptible to embodiment in many different forms, the exemplary embodiments shown in the drawings and described in detail herein, illustrate the invention with the understanding that the present disclosure is to be considered as an exemplification of the principles of the invention and is not intended to limit the broad aspect of the invention to the exemplary embodiments illustrated.

The numerous innovative teachings of the present application will be described with particular reference to the exemplary embodiments, wherein these innovative teachings are advantageously applied to the particular problems of a LIVESTOCK IDENTIFICATION SYSTEM AND METHOD. In general, statements made in the specification of the present application do not limit any of the various claimed inventions. Moreover, some statements may apply to some inventive features but not to others.

Internet Communication not Limiting

The present invention anticipates that a wide range of communication methodologies may be utilized to affect a specific implementation of the present invention. While the present invention specifically anticipates the use of the Internet for most applications, the present invention makes no limitation on the type of communication technology or computer networking that may be used. Thus, the term "computer network" and/or "Internet" are to be given the broadest possible definitions within the scope of the present invention. The term "web browser" should not be read as a limitation on the term "software application."

System Overview (0100)

As generally depicted in FIG. 1 (0100), an exemplary embodiment may be broadly described in an overview context as comprising an image capture device (0111) that captures images of animal livestock (0101) and transmits these images to an image processing computer (0112) configured to transform the livestock images into a form that may be matched with a livestock database (0113) using a livestock identification process (0114) executed by the image processing computer (0112). Once the livestock (0101) has been identified, various status parameters associated with the livestock (0101) may be analyzed under computer control by a livestock analysis process (0115) to determine the health and harvest potential of the livestock (0101).

Digital images of individual livestock animals (0101) are captured periodically by one or more cameras (0111) focused on the face (or other distinctive and descriptive parts) of the livestock (0101). The digital images may be captured when the animal (0101) is in a range of commonly encountered livestock situation, for example, when positioned a set distance from the cameras while drinking water from a gauged water dispensing mechanism. The amount of water consumed by the livestock may be measured and recorded along with the images. In an alternative embodiment the system may utilize a means of remotely sensing the body temperature of the livestock (0101) such as an infrared detector (0102).

The mean distance in pixels between the eyes of each animal (0101) may be used in some exemplary embodiments to estimate the body weight of the livestock (0101). A non-linear curve-fitting algorithm uses the pixel distance to calculate a value along an exponential curve to project an estimated body weight in the broad weight range of birth to 100 kg. A linear curve-fitting algorithm using the pixel distance may also be used in some exemplary embodiments to project an estimated body weight where the weight is expected to be within a narrower weight range of 5-42 kg.

The body weight and other physical information gathered by the system may be utilized by farm managers to make decisions on whether livestock (0101) require medical attention, nutritional attention, or market harvesting.

Method Overview (0200)

Figure 2:
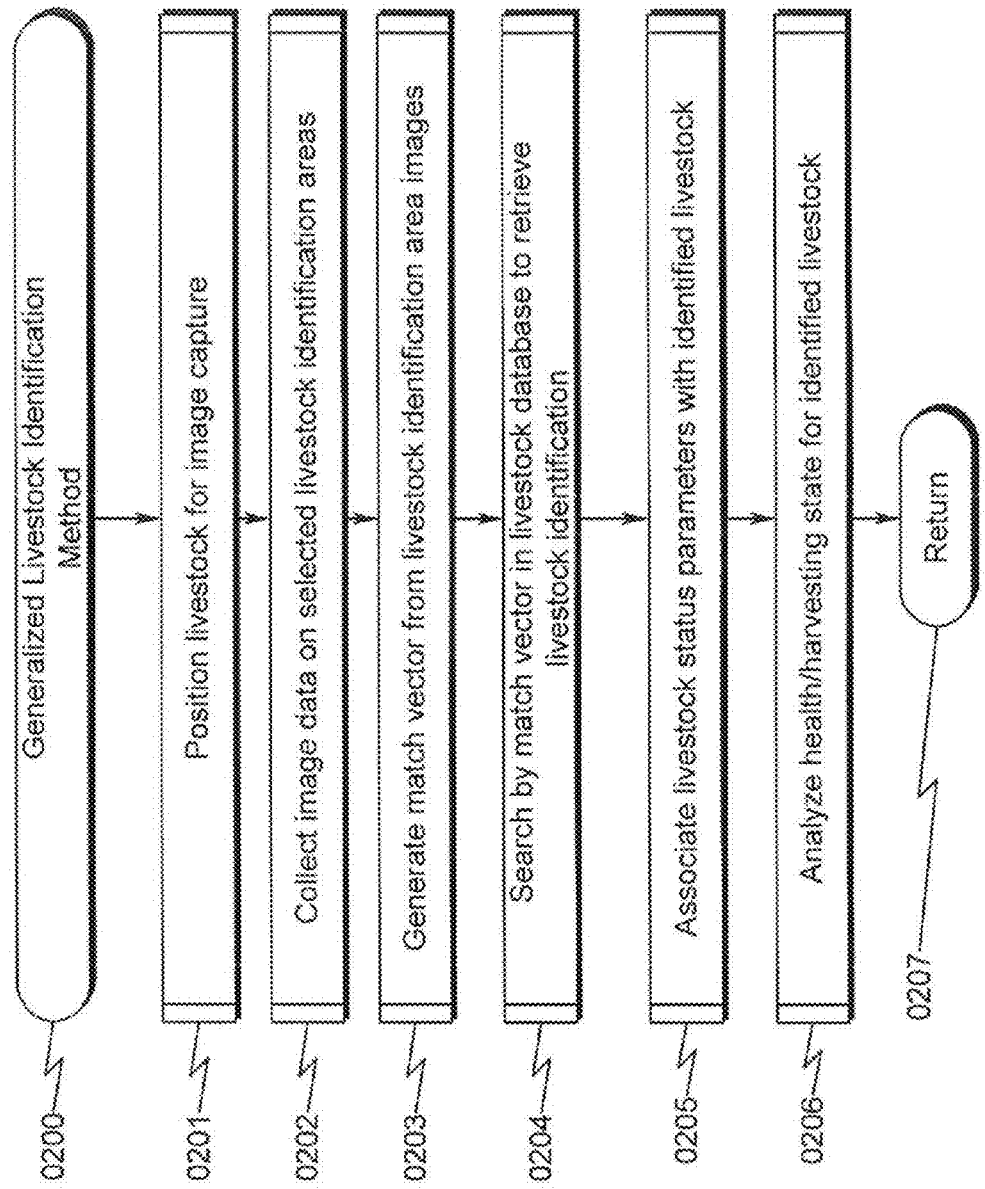
FIG. 2 illustrates a flowchart depicting a preferred exemplary generalized livestock identification method overview embodiment of the present invention.

As generally depicted in the overview flowchart of FIG. 2 (0200), an exemplary embodiment incorporates the following steps:

(1) Positioning livestock in proximity to an image capture device (0201);
(2) Collecting image data on selected livestock identification areas (such as the face or other features) (0202);
(3) Generating a match vector from the imaged livestock identification areas (0203);
(4) Searching by the match vector in a livestock database to retrieve the identification of the imaged livestock (0204);
(5) Associating livestock status parameters (such as water intake, food intake, weight, etc.) with the identified livestock (0205); and
(6) Analyzing the health and/or harvesting potential for the identified livestock based on the associated livestock status parameters (0206);
(7) Repeating this method for each livestock individual in the population (0207).

System Overview (0300)

Figure 3:
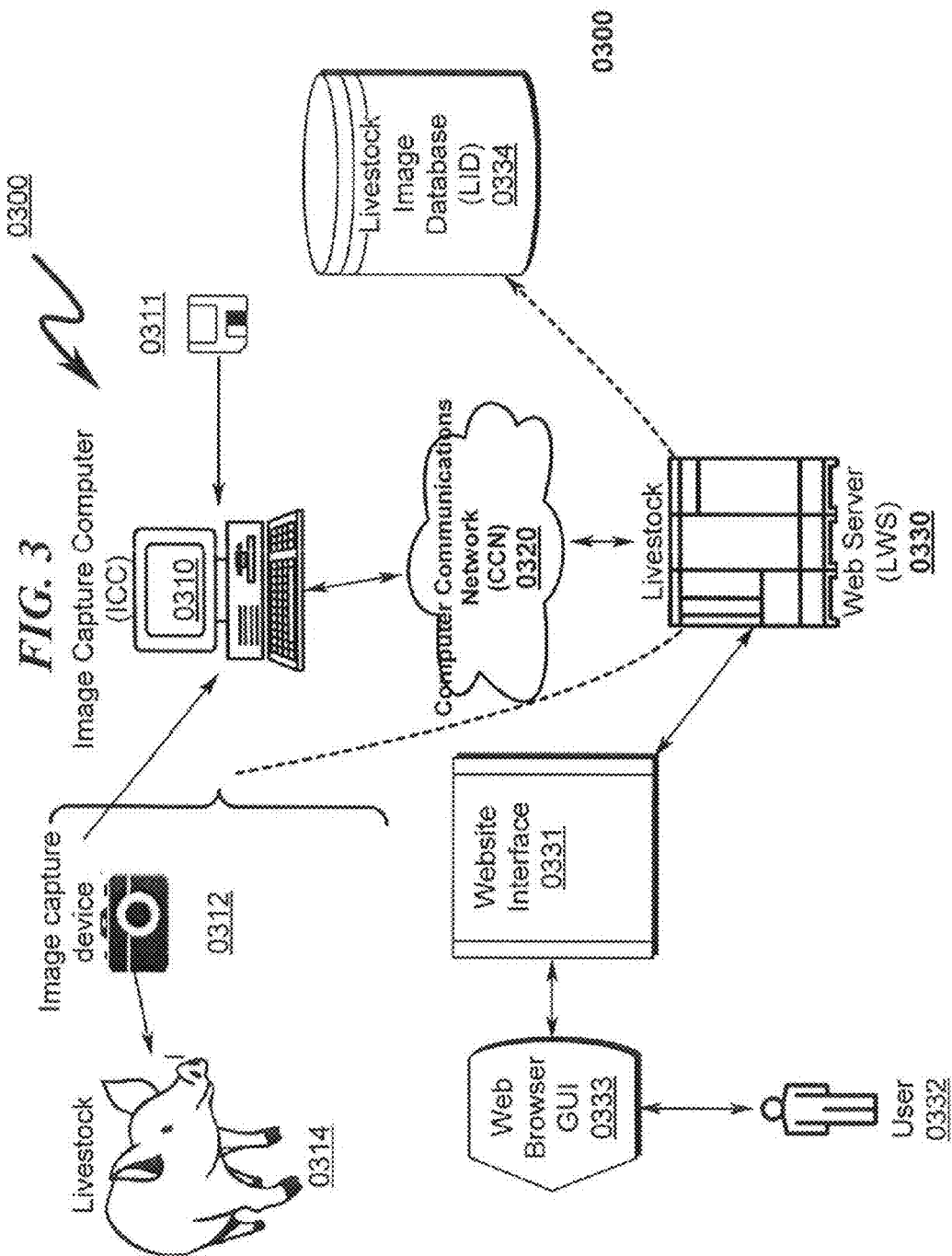
FIG. 3 illustrates a preferred exemplary generalized system overview embodiment of the present invention.

A system block diagram overview of an exemplary embodiment of the presently disclosed invention system is generally illustrated in FIG. 3 (0300). Here it can be seen that the system comprises an image capture computer (0310) executing instructions read from a computer readable medium (0311) to control an image capture device (0312) that images a livestock animal (0314). This imaging process produces livestock animal image data (AID) that is communicated over a computer communications network (0320) to a livestock web server (LWS) (0330) which executes website software (0331) to interface a user (0332) to a graphical user interface (GUI) (0333). AID information regarding the livestock animal (0314) is stored by the LWS (0330) in a livestock image database (LID) (0334) and used to both identify the livestock animal (0314) and perform various analysis operations on the state of the livestock animal (0314).

Method Overview (0400)

Figure 4:
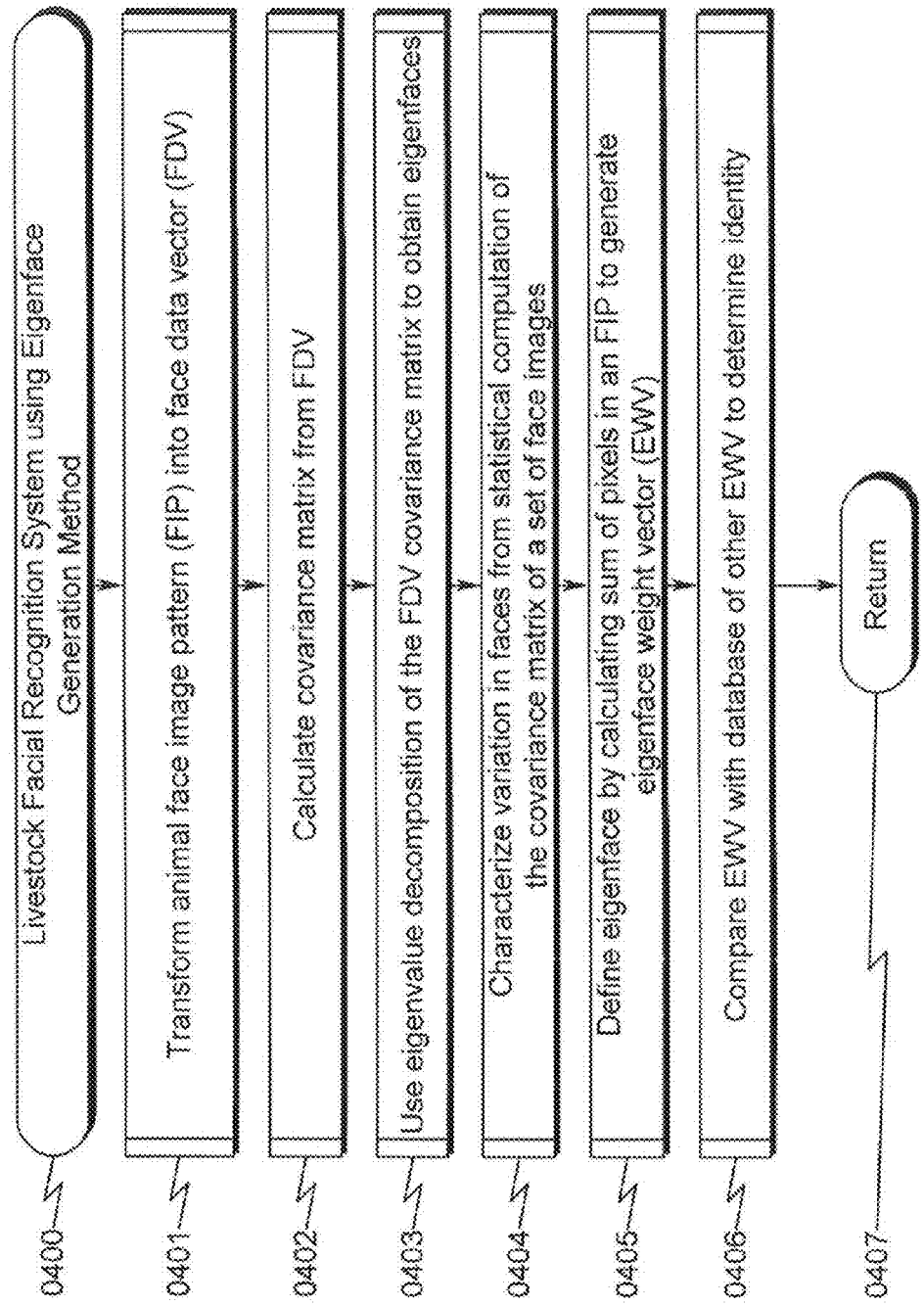
FIG. 4 illustrates a preferred exemplary livestock facial recognition system using eigenface generation method overview embodiment of the present invention.

The above-described exemplary system may have an associated exemplary method, as generally depicted in the overview flowchart of FIG. 4 (0400). The method may be generalized as a livestock identification method comprising at least some of the following steps:
(1) Transforming livestock animal face image pattern (FIP) into face data vector (FDV) (0401);
(2) Calculating a covariance matrix from the FDV (0402);
(3) Using eigenvalue decomposition of the FDV covariance matrix to obtain eigenfaces (403);
(4) Characterizing the variation in faces from statistical computation of the covariance matrix of a set of face images (0404);
(5) Defining an eigenface value by calculating sum of pixels in an FIP to generate an eigenface weight vector (EWV) (0405);
(6) Comparing the EWV with a database of other previously stored EWV to determine the livestock animal identity (0406); and
(7) Repeating this method for each livestock individual in a population (0407).

This general exemplary method may be modified depending on a number of factors, for example by rearrangement and/or addition/deletion of steps. Integration of this and other preferred exemplary embodiment methods in conjunction with a variety of preferred exemplary embodiment systems described herein is within the overall scope of the present invention.

System Detail (0500)

Figure 5:
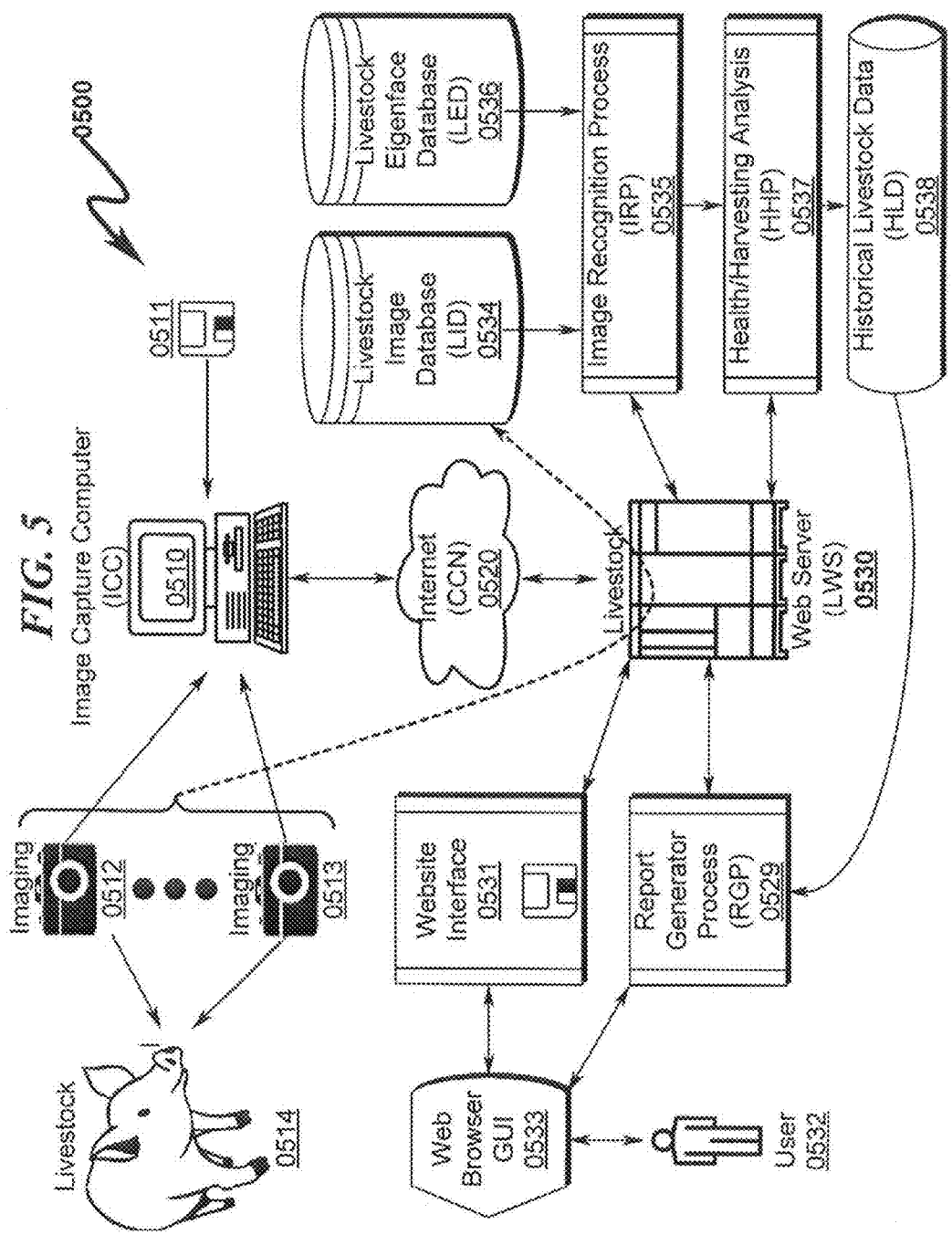
FIG. 5 illustrates another embodiment of a detailed overview of system for estimating the weight or health of a target livestock animal.

A detail overview of an exemplary embodiment of the presently disclosed invention system is generally illustrated in FIG. 5 (0500). As depicted in this figure, the system comprises a computer system (0510) configured to execute software constituting machine instructions read from a computer readable medium (0511). These machine instructions operate to interface with one or more imaging systems (0512, 0513) that are configured to capture image and/or video information from a member of a population of livestock (0514). These images may in some exemplary embodiments be collected using stereoscopic and/or 3D imaging techniques. Individual livestock (0514) imaged in this fashion may also be associated with specific eating, drinking, and/or activity within the area in which they are housed and/or fed.

The image capturing computer system (0510) may be connected via a computer network (typically the Internet) (0520) to a livestock web server (LWS) (0530) responsible for processing the animal image data (AID). The LWS (0530) operates under control of software read from a computer readable medium to implement a website interface (0531) from which users (0532) may interface remotely using a conventional web browser graphical user interface GUI (0533).

The animal image data are stored on a livestock image database (LID) (0534) by the LWS (0530) and processed by an image recognition process (IRP) (0535) that compares the LID (0534) information with livestock templates stored in a livestock eigenface database (LED) (0536) that describe various types of livestock and their known states. Once identification of a particular livestock animal (0514) has been performed by the IRP (0535), a health and harvesting process (HHP) (0537) is executed by the LWS (0530) to determine the health of the identified livestock animal (0514) and its potential for harvesting. This analysis may utilize previously stored information in a historical livestock database (HLD) (0538).

At any time in this process the user (0532) may query the LWS (0530) using a web browser GUI (0533) to create a report using a report generator process (0529) as to the health of an individual livestock animal (0514) and/or its potential for harvesting. This generated report (0529) may also permit aggregation of information on an entire population of livestock to permit optimization of harvesting or calculation of population value based on current market pricing for harvested livestock. This also permits culling of the population to remove livestock that are potentially ill, and/or may pose a risk of infection, or may otherwise be unsuitable for future harvesting.

Method Detail (0600)

Figure 6:
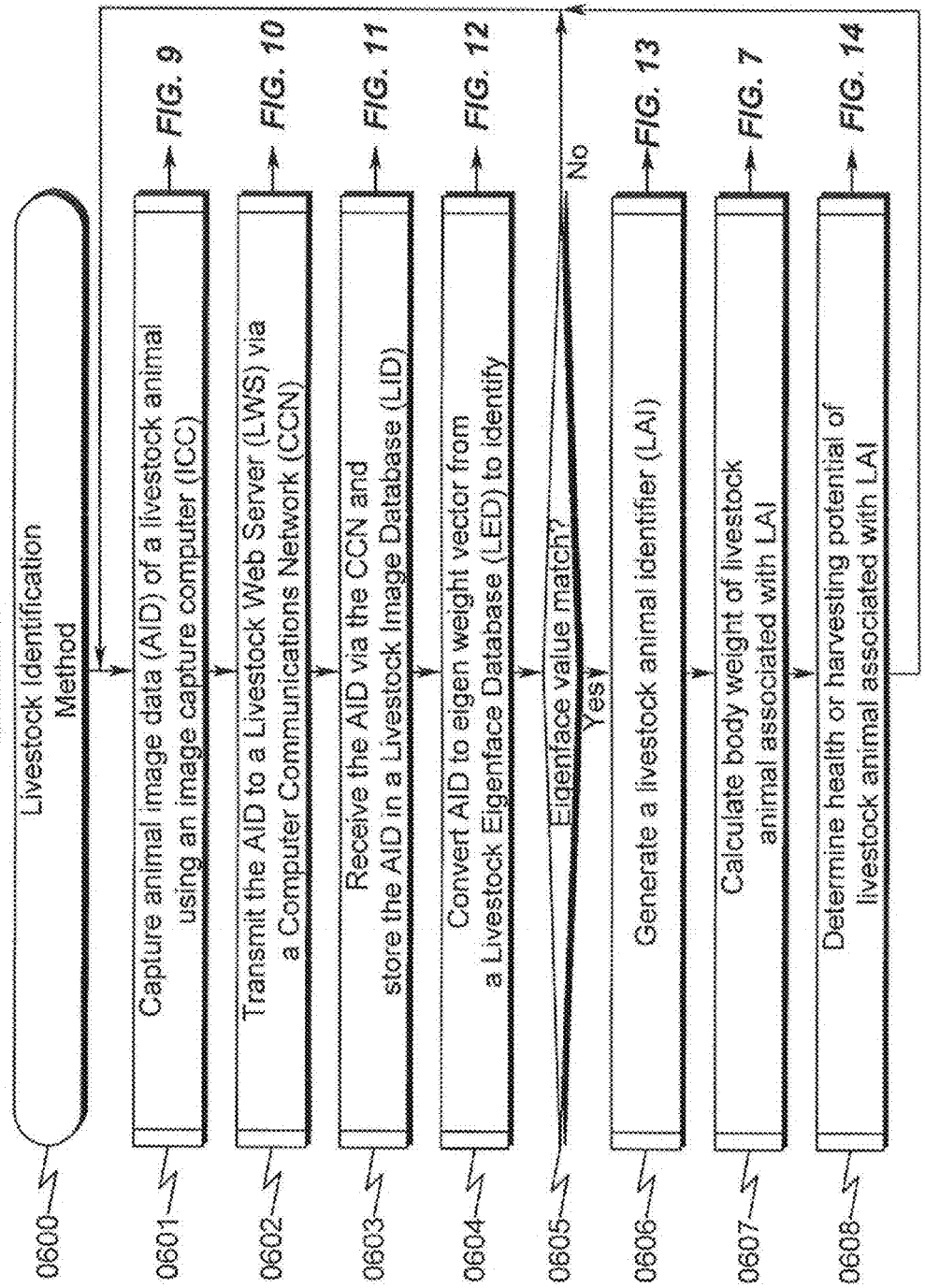
FIG. 6 illustrates another embodiment of a livestock identification method.

The above-described system may have an associated exemplary method, as generally depicted in the detail flowchart of FIG. 6 (0600). The method may be generalized as a livestock identification method comprising at least some of the following steps:
(1) Capturing animal image data (AID) of a livestock animal using an image capture computer (ICC) (0601);
(2) Transmitting the AID to a livestock web server (LWS) via a computer communications network (CCN) (0602);
(3) Receiving the AID via the CCN and storing the AID in a livestock image database (LID) (0603);
(4) Comparing the AID against an eigenface template retrieved from a livestock eigenface database (LED) (0604);
(5) Determining if there is an eigenface value match, and if not proceeding to the step (1) (0605);
(6) Generating a livestock animal identifier (LAI) based on the comparison of the AID against the LED (0606);
(7) Determining the health or harvesting potential of livestock animal associated with the LAI (0607); and
(8) Generating a report of the health or the harvesting potential to a graphical user interface (GUI) presented to a user over a web browser (0608).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (0700)

Figure 7:
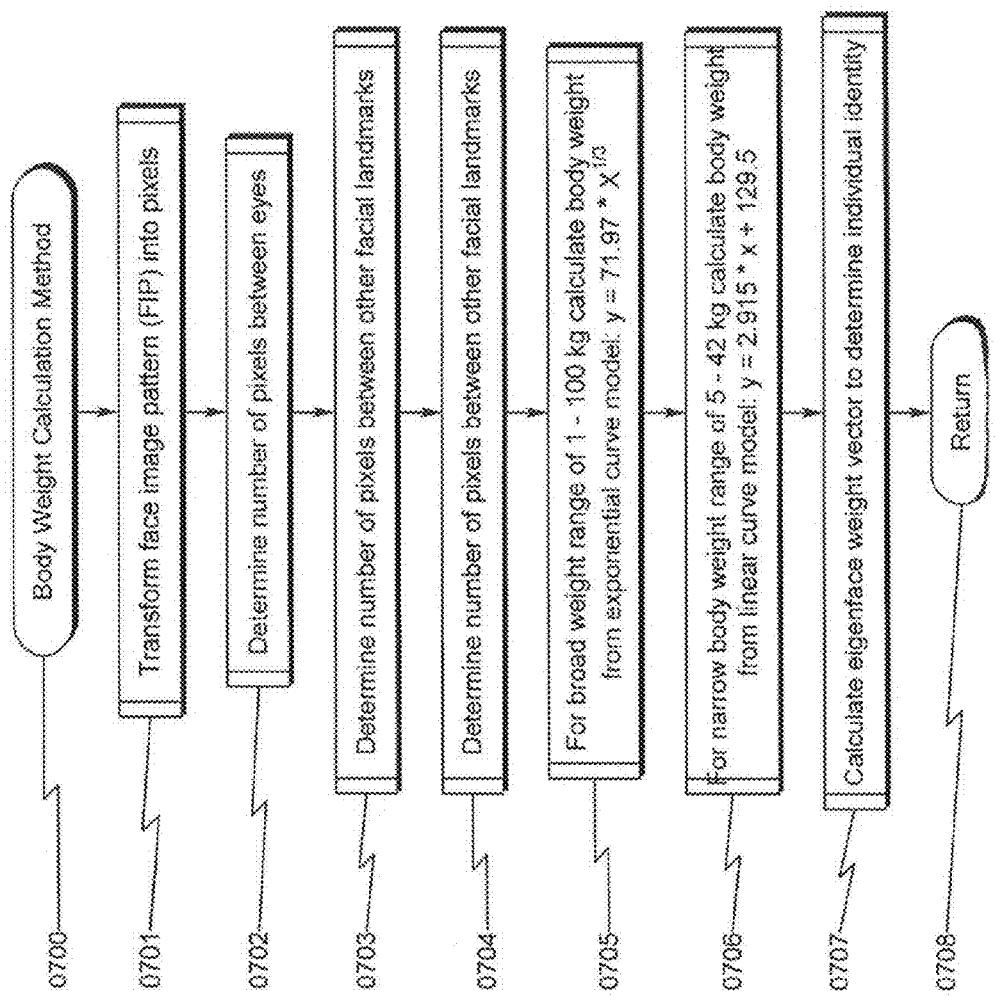
FIG. 7 illustrates another embodiment of a body weight calculation method for a target livestock animal.

The above-described system may have an associated exemplary method, as generally depicted in the detail flowchart of FIG. 7 (0700). The method may be generalized as a livestock body weight calculation method comprising at least some of the following steps:
(1) Decomposing complex image pattern (CIP) of (AID) into pixels (0701);
(2) Determining number of pixels between eyes of livestock animal (0702);
(3) Determining number of pixels between other facial landmarks (0703);
(4) Calculating body weight in broad weight range of 1-100 kg using exponential curve fitting model (0704);
(5) Calculating body weight in narrow weight range of 5-42 kg using linear curve fitting model (0705);
(6) Calculating eigenface weight vector (EWV) to determine individual identity (0706); and
(7) Repeating this method for each individual livestock animal in population (0707).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (0800)

Figure 8:
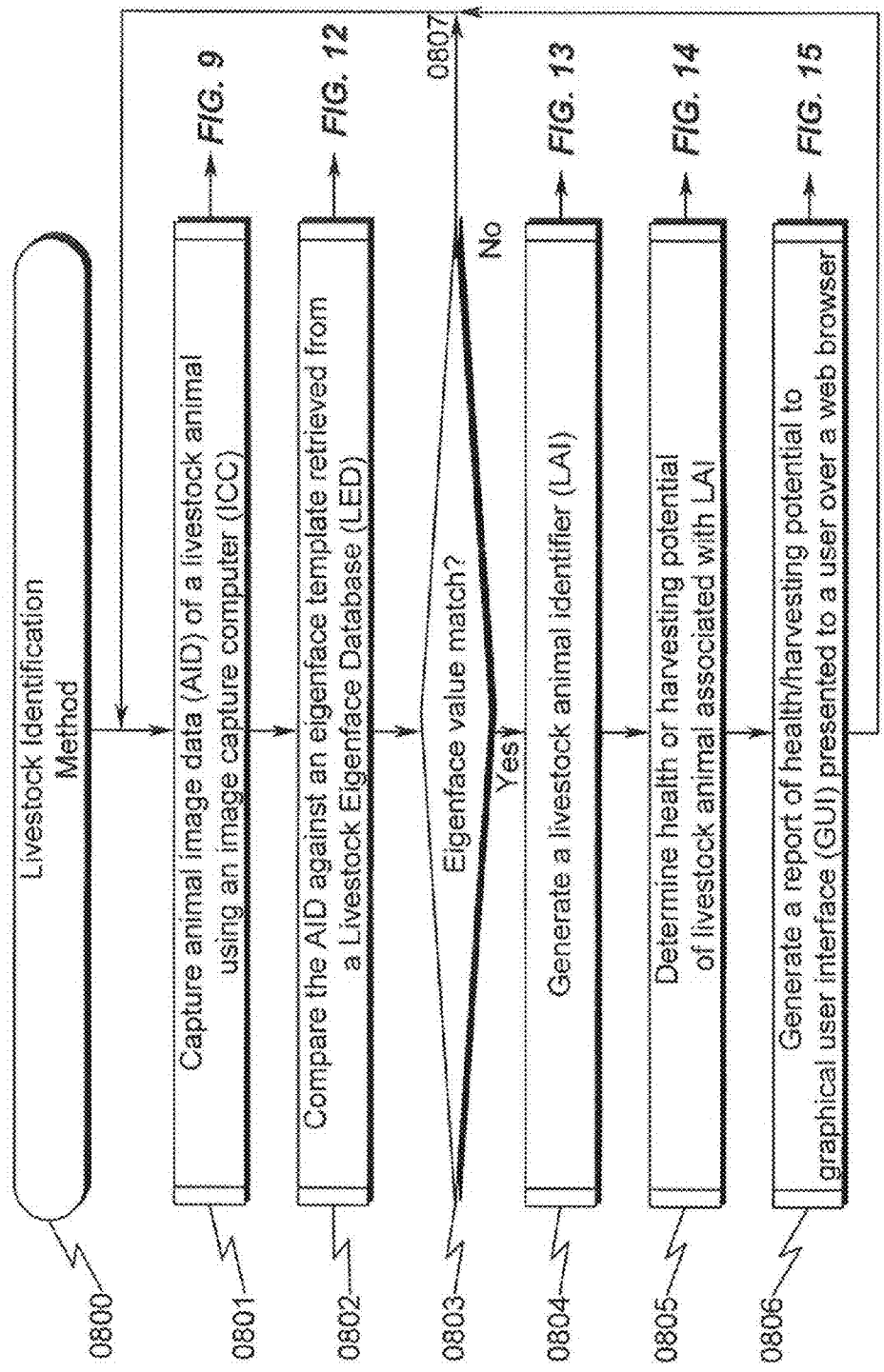
FIG. 8 illustrates another embodiment of a livestock animal identification method.

The above-described system may have an associated exemplary method, as generally depicted in the detail flowchart of FIG. 8 (0800). The method may be generalized as a livestock health and harvest determination method comprising at least some of the following steps:

(1) Capturing animal image data (AID) using an image capture computer (ICC) (0801);
(2) Comparing AID against eigenface weight vector (EWV) retrieved from livestock eigenface database (0802);
(3) Determining whether an EWV match is found (0803);
(4) Generating a livestock animal identifier (LAI) if and EWV is found and returning to the AID capturing step if no EWV match is found (0804);
(5) Determining health or harvesting potential for an LAI (0805);
(6) Generating a report of animal health and harvesting potential viewable through a graphical user interface (GUI) to a user via a web browser (0806); and
(7) Repeating this method for each individual livestock animal in population (0807).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Livestock Animal Image Data (AID) Capture Method (0900)

Figure 9:
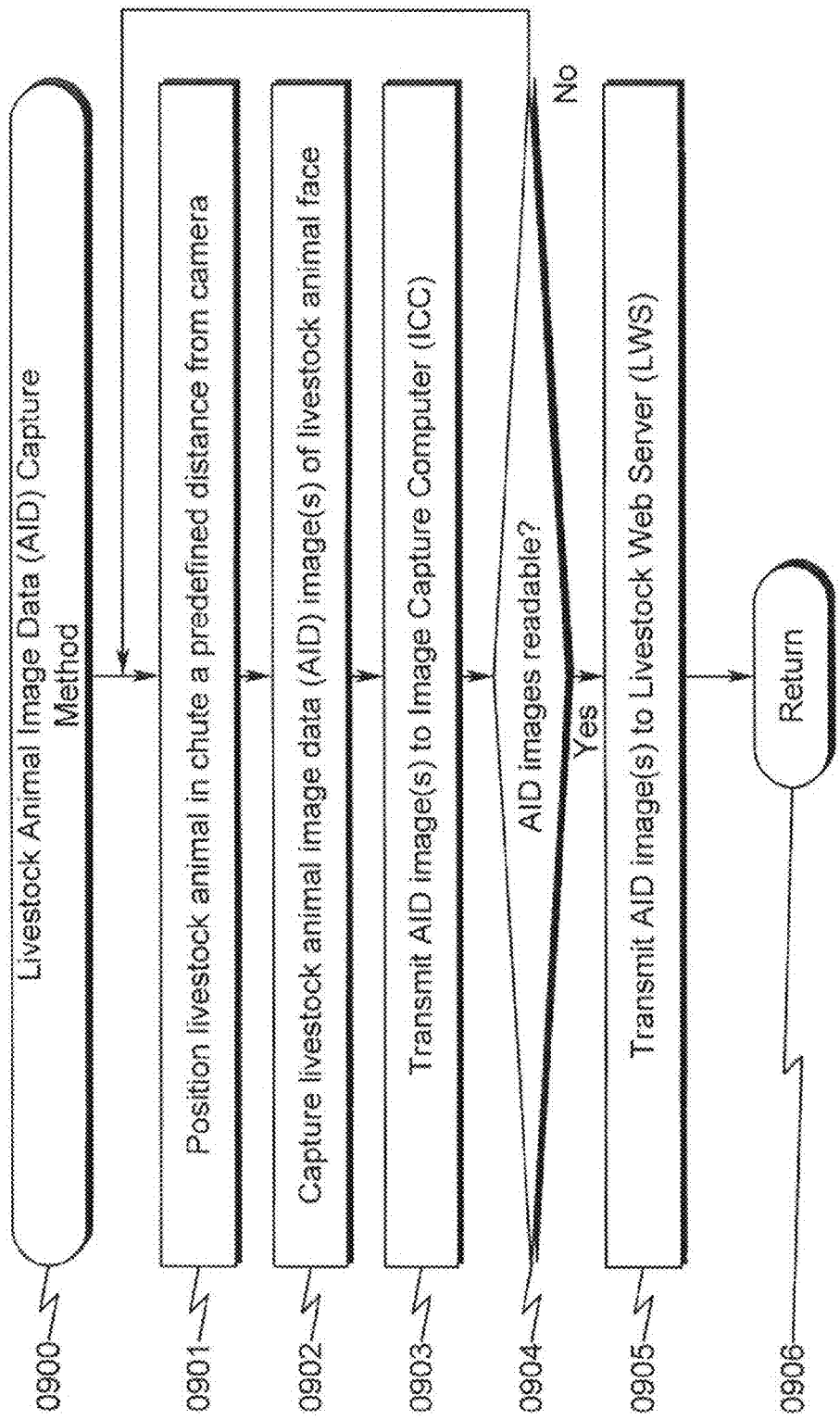
FIG. 9 illustrates another embodiment of a livestock animal image data capture method.

The above-described system may have an associated livestock animal image data (AID) capture method as generally depicted in FIG. 9 (0900). The method can be generalized as a livestock animal image data (AID) capture method comprising at least some of the following steps:

(1) Positioning the livestock animal, for example, in a chute or other apparatus, in a predefined position and distance from a camera or other imaging device (0901);
(2) Capturing one or more livestock animal image data (AID) images of the livestock animal face using the camera or other imaging device (0902);
(3) Transmitting AID images to an image capture computer (ICC) (0903);
(4) Determining if the AID images are readable, and if not, proceeding back to step (1) (0904);
(5) Transmitting the AID images to a livestock web server (LWS) via a computer communication network (CCN) (0905); and
(6) Repeating this method for each livestock animal in the population (0906).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1000)

Figure 10:
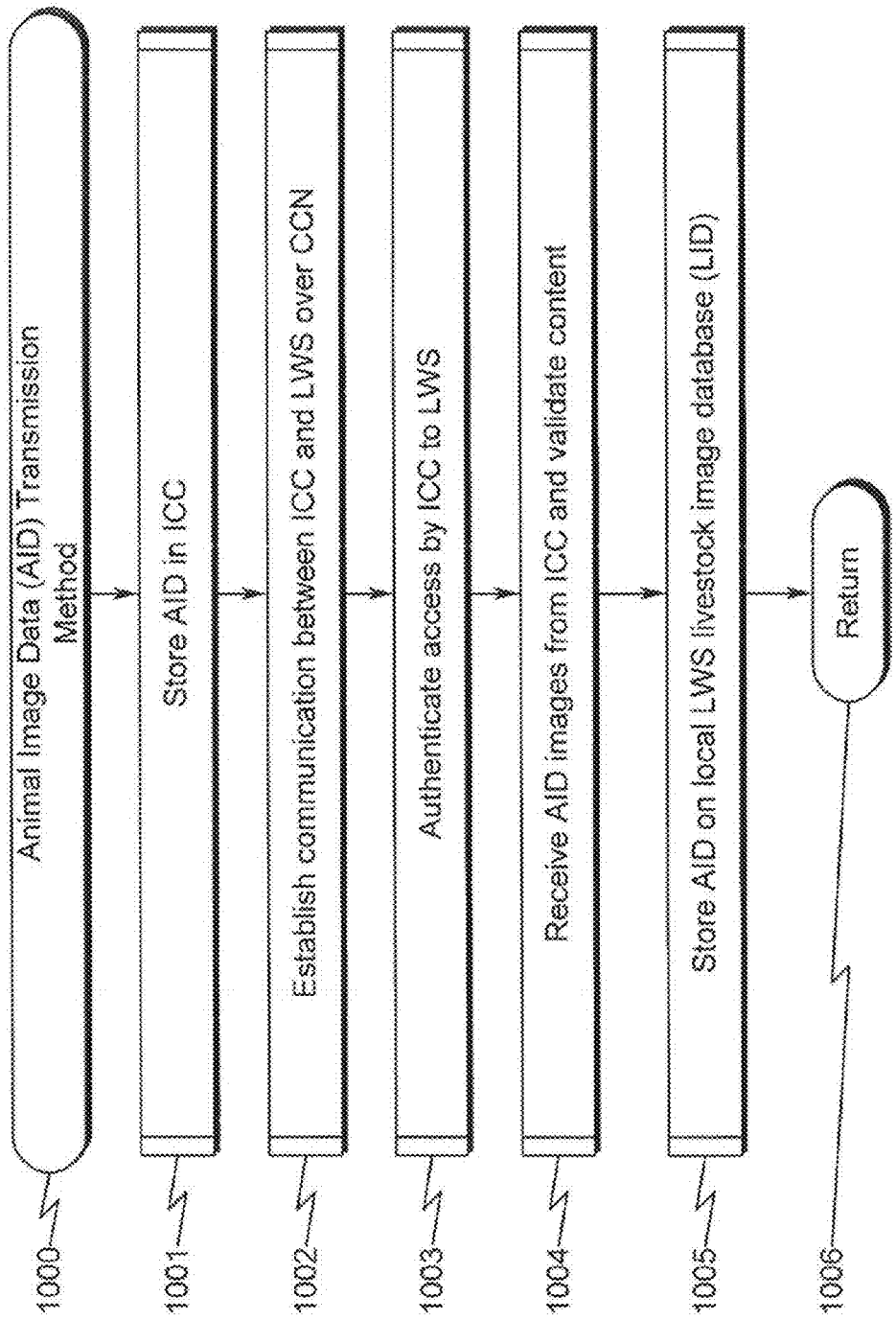
FIG. 10 illustrates another embodiment of a livestock animal image data transmission method.

The above-described system may have an associated exemplary method, as generally depicted in the detail flowchart of FIG. 10 (1000). The method may be generalized as an Animal Image Data (AID) Transmission method comprising at least some of the following steps:

(1) Storing the captured animal image data (AID) in an image capture computer (ICC) (1001);
(2) Establishing communication between ICC and livestock web server (LWS) over computer communications network (CCN) (1002);
(3) Authenticating access by ICC to LWS (1003);
(4) Receiving animal image data (AID) from ICC and validating content (1004);
(5) Storing AID on local LWS in livestock image database (LID) (1005);
(6) Repeating this method for each individual livestock animal in population (1006).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1100)

Figure 11:
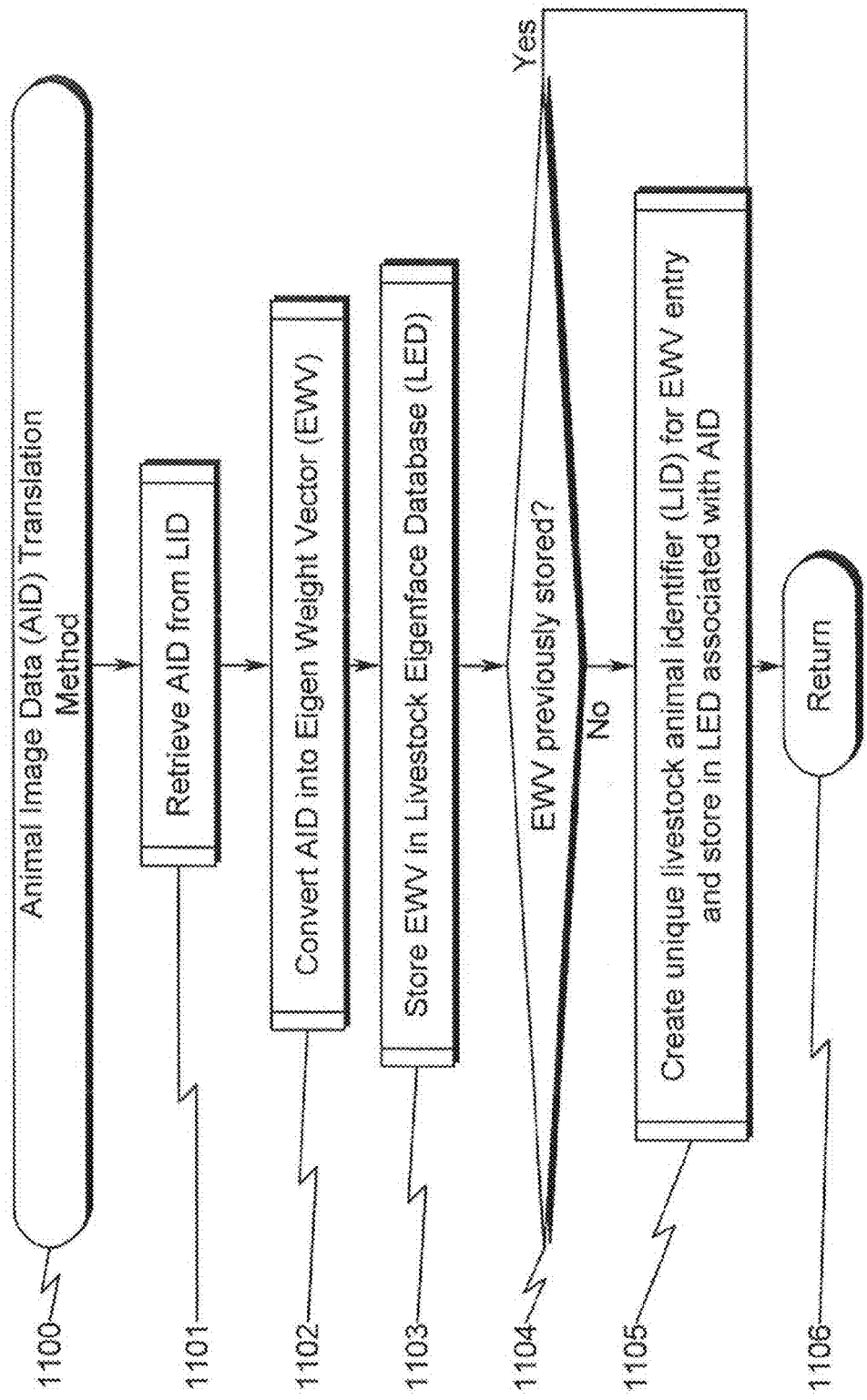
FIG. 11 illustrates a method for translating the animal image data of a target livestock animal.

The above-described system may have an associated exemplary method, as generally depicted in the detail flowchart of FIG. 11 (1100). The method may be generalized as an animal image data (AID) translation method comprising at least some of the following steps:

(1) Retrieving animal image data (AID) from the livestock image data (LID) (1101);
(2) Converting AID into eigenface weight vector (EWV) (1102);
(3) Storing EWV in livestock eigenface database (LED) (1103);
(4) Determining whether the EWV has been previously stored or not (1104);
(5) Creating a unique livestock animal identifier (LID) for EWV entry and store in LED associated with AID (1105); and
(6) Repeating this method for each individual livestock animal in population (1107).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1200)

Figure 12:
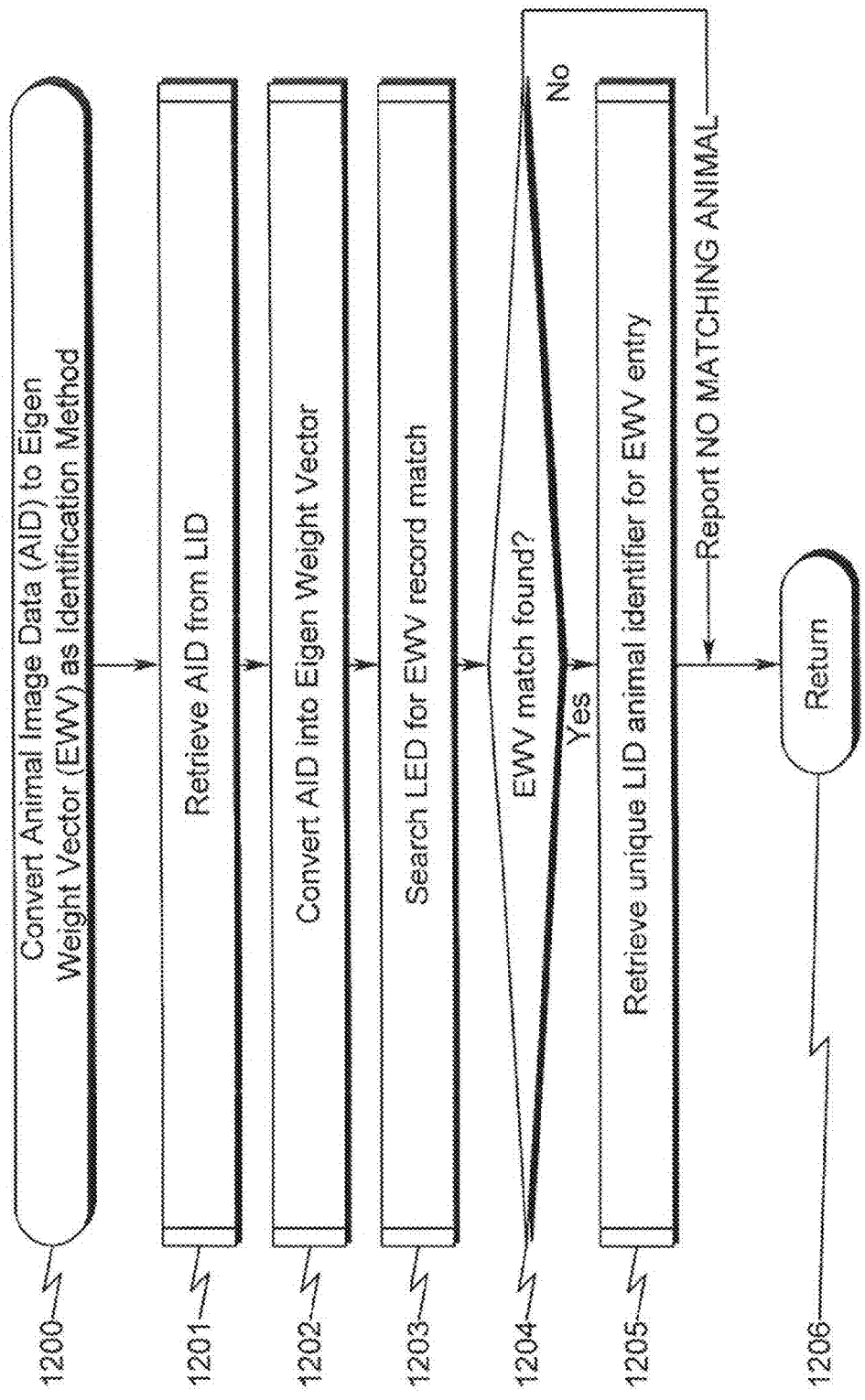
FIG. 12 illustrates a method to convert animal image data to eigenface weight vector as identification method.

The above-described system may have an associated exemplary method, as generally depicted in the detail flowchart of FIG. 12 (1200). The method may be generalized as an animal image data (AID) identification method comprising at least some of the following steps:

(1) Retrieving animal image data (AID) from the Livestock Image Data (LID) (1201);
(2) Converting AID into eigenface weight vector (EWV) (1202);
(3) Searching the LED for EWV entry match (1203);
(4) Determining whether the EWV matches a previously stored value or not (1204);
(5) Retrieving a unique livestock animal identifier (LAI) for EWV entry and storing in LED associated with AID (1205); and (6) Repeating this method for each individual livestock animal in population (1206).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1300)

Figure 13:
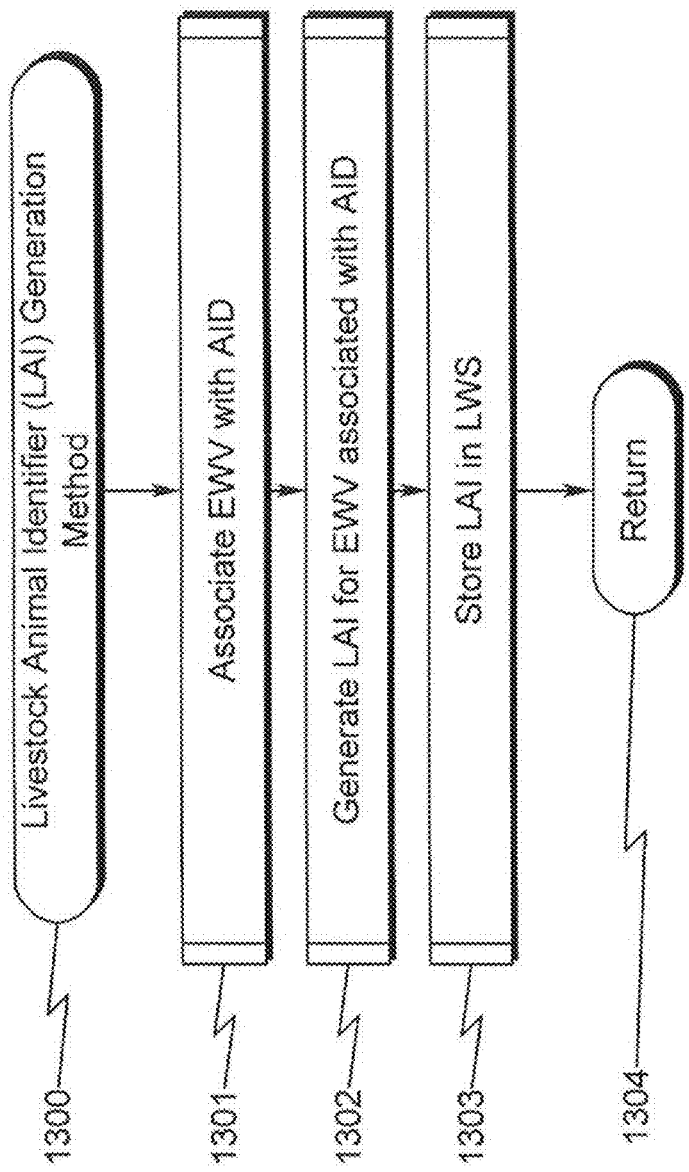
FIG. 13 illustrates a method of generating the livestock animal identifier.

The above-described system may have an associated exemplary method, as generally depicted in the detail flowchart of FIG. 13 (1300). The method may be generalized as a Livestock Animal Identifier (LAI) Generation method comprising at least some of the following steps:
(1) Associating eigenface weight vector (EWV) with animal identification data (AID) (1301);
(2) Generating livestock animal identifier (LAI) for EWV associated with (1302);
(3) Storing LAI in livestock web server (LWS) (1303);
(4) Repeating this method for each individual livestock animal in population (1304).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1400)

Figure 14:
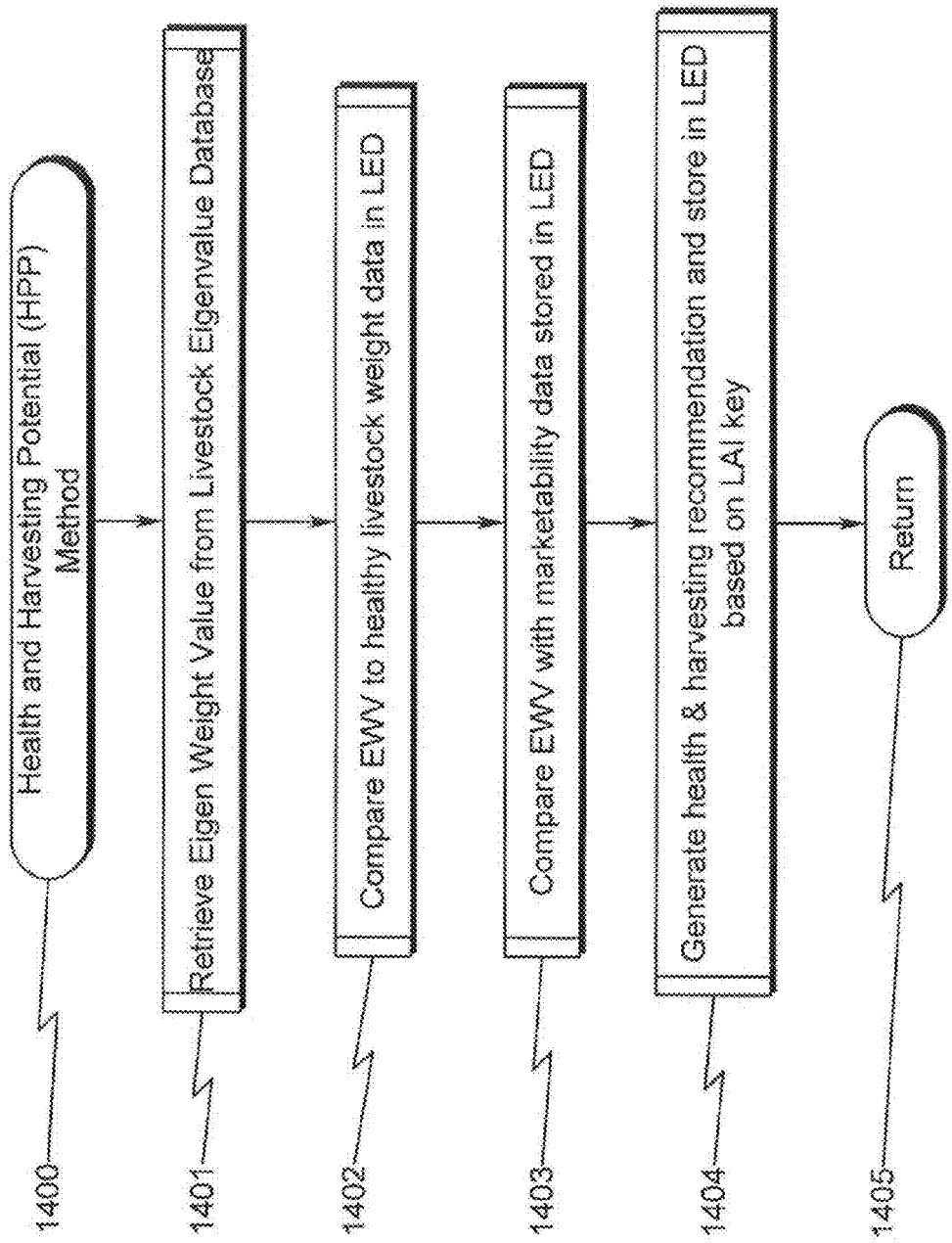
FIG. 14 illustrates a method of generating a recommendation of health and harvesting potential of a livestock animal identifier to a graphical user interface (GUI) presented to a user over a web browser.

The above-described system may have an associated exemplary method, as generally depicted in the detail flowchart of FIG. 14 (1400). The method may be generalized as an Animal Health and Harvesting Potential (HHP) method comprising at least some of the following steps:
(1) Retrieving eigenface weight vector (EWV) from the Livestock Eigenvalue Database (LED) (1401);
(2) Comparing EWV to healthy livestock weight data in LED (1402);
(3) Comparing EWV to marketability data in LED (1403);
(4) Generating a health and harvesting recommendation and storing in LED based on LAI (1404); and
(5) Repeating this method for each individual livestock animal in population (1405).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1500)

Figure 15:
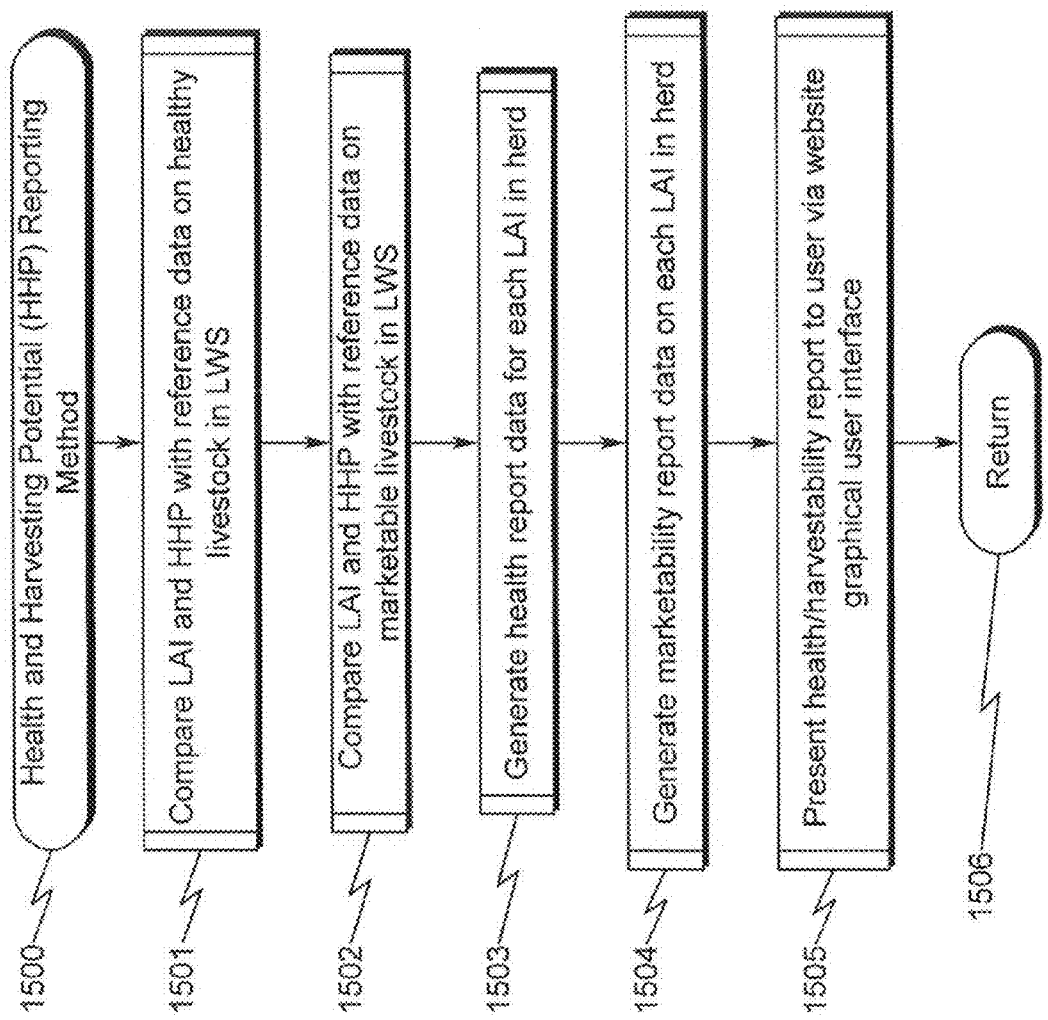
FIG. 15 illustrates a method of generating a livestock animal identifier (LAI)

The above-described system may have an associated exemplary method, as generally depicted in the detail flowchart of FIG. 15 (1500). The method may be generalized as a Health and Harvesting Potential (HHP) reporting method comprising at least some of the following steps:
1. Comparing livestock animal identifier (LAI) and health and harvesting potential on healthy livestock with reference information in livestock web server (LWS) (1501);
2. Comparing livestock animal identifier (LAI) and health and harvesting potential on marketable livestock with reference information in livestock web server (LWS) (1502);
3. Generating a report on health of each livestock animal identifier (1503);
4. Generating a report on marketability of each livestock animal identifier (1504);
5. Presenting a report on animal health and harvest-ability to a user via website graphical user interface (1505); and
6. Repeating this method for each individual livestock animal in population (1506).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1600)

Figure 16:
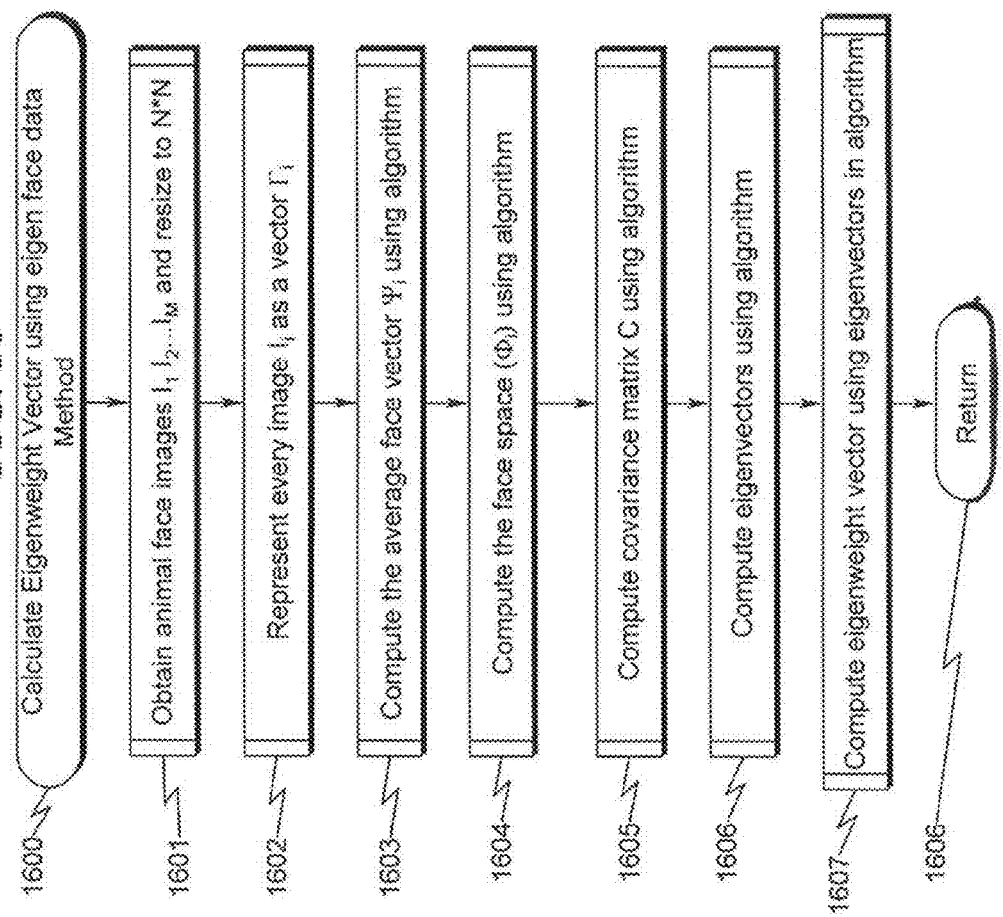
FIG. 16 illustrates a method of calculating the eigenface weight vector using eigenface data of a livestock animal associated with LAI.

The above-described system may have an associated exemplary method, as generally depicted in the detail flowchart of FIG. 16 (1600). The non-limiting, exemplary method may be generalized as an eigenweight vector (EWV) calculation method comprising at least some of the following steps:
1. Obtaining livestock animal face images $I_1, I_2, \ldots I_M$ and resize the images to N*N (1601);
2. Representing every face image as a vector $_i$ (1602);
3. Computing the average face vector using algorithm $$\Psi = \frac{1}{M}\sum_{i=1}^{M}\Gamma_i$$

(1603);
4. Computing the space between facial landmarks ($_i$) by subtracting the average face vector from the individual face image vector using algorithm $\Phi_i = \Gamma_i - \Psi$ (1604);
5. Computing the covariance matrix C using the:

$$C = \frac{1}{M}\sum_{n=1}^{M}\Phi_n\Phi_n^T = AA^T \quad (N^2 \times N^2 \text{ matrix})$$

were $A = [\Phi_1\ \Phi_2\ \ldots\ \Phi_M]$ ($N^2 \times M$ matrix) algorithm (1605);
6. Computing the eigenvectors ($v_i$) of $A^T A$ (M*M matrix), which is much smaller than the $AA^T(N^2*N^2)$. The components $AA^T$ and $A^TA$ share the same eigenvalues and the eigenvectors that we desire are represented as $\mu_i$, which is equal to $Av_i$; Control logic keeps the best M' eigenvectors. (Corresponding to the M' largest eigenvalues) (1606);
7. Computing the individual weight vector $w_k$ from the eigenvalues and eigenvectors of each animal image using the algorithm:

$$w_k = \mu_k^T(\Gamma - \Psi)$$

Where the set of weights form a weight vector $\Omega^T = [w_1, w_2, \ldots, w_{M'}]$, which describe the contribution of each eiganface component in representing the new face image and where the same operation is performed to the training face images ($\Phi_i$) and get a corresponding eigenweight vector $\Omega_i$ (1607); and
8. Repeating this method for each individual livestock animal in a population (1608).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

Method Detail (1700)

Figure 17:
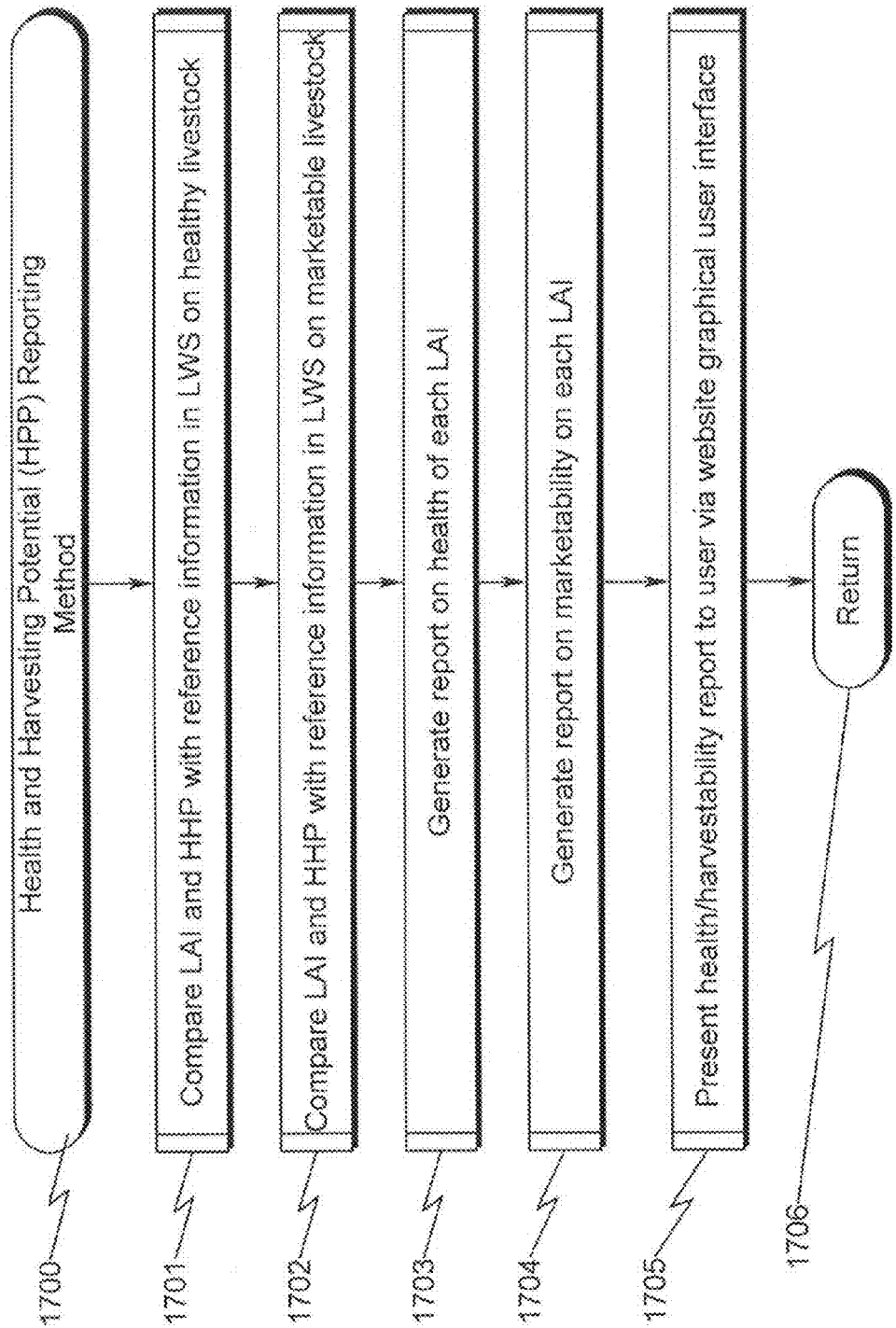
FIG. 17 illustrates a method of generating a report of health/harvesting potential to a graphical user interface GUI presented to a user over a web browser.
Figure 18A:
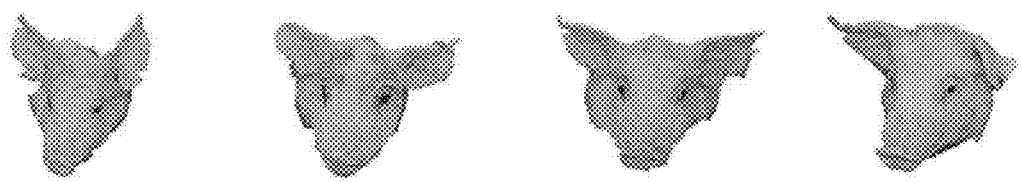
FIG. 18 A-E represent exemplary photographs for explaining the eigenface weight vector technology.
Figure 18B:
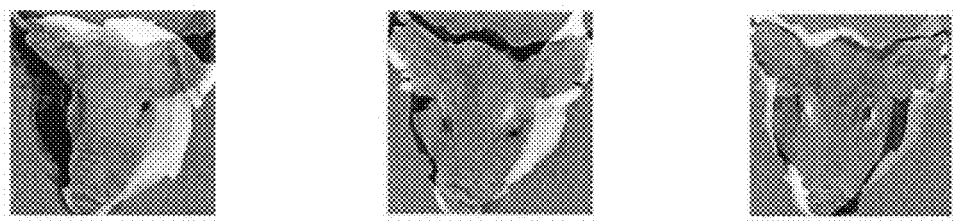
Figure 18D:
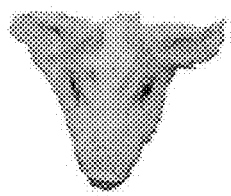
Figure 18E:
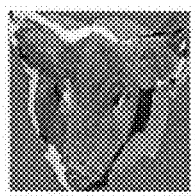

The above-described system may have an associated exemplary method, as generally depicted in the detail flowchart of FIG. 17 (1700). The non-limiting, exemplary method may be generalized as an eigenweight data comparison method comprising at least some of the following steps:

1. Comparing an unknown eigenweight vector ($\Omega_i$) with the average eigenweight vector to an error according to the following algorithm: $e_i = \|\Omega - \Omega_i\|$, if $e_i$ is low enough, find closest match from among all possible matches (1701);
2. Comparing livestock animal identifier (LAI) and health and harvesting potential on marketable livestock referencing information in livestock web server (LWS) (1702);
3. Generating a report on health of each livestock animal identifier (1703);
4. Generating a report on marketability of each livestock animal identifier (1704);
5. Presenting a report on animal health and harvest-ability to a user via website graphical user interface (1705); and
6. Repeating this method for each individual livestock animal in population (1706).

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

System Summary

An exemplary system of the present inventions cover a wide variety of variations in the basic theme of construction, but can be generalized as a livestock identification system including:
  (a) Image Capture Computer (ICC);
  (b) Image Processing Computer (IPC);
  (c) Livestock Web Server (LWS);
  (d) Livestock Image Database (LID);
  (e) Livestock Eigenface Database (LED);
  (f) Livestock Historical Database (LHD); and
  (g) Computer Communications Network (CCN);
  Wherein
  The ICC is configured to capture animal image data (AID) of a livestock animal;
  The IPC is electrically coupled to the ICC and configured to receive the AID from the ICC;
  The IPC is configured to operate under control of machine instructions read from a computer readable medium;
  The ICC is configured to transmit the AID to the LWS over the CCN;
  The LWS is configured to receive the AID and store the AID in the LID;
  the LWS is configured to convert the AID into an eigenface match vector (EMV) and compare the EMV against an eigenface weight vector (EWV) retrieved from the LED to determine if the livestock animal can be matched to the LED, and if so, generate a livestock animal identifier (LAI);
  The LWS is configured to retrieve information associated with the LAI from the LHD and determine the health or harvesting potential of the livestock animal associated with the LAI; and
  said LWS is configured to generate a report of the health or the harvesting potential via a web browser graphical user interface (GUI) operating on a remote computer system interacting with a user communicating with the LWS over the CCN.

This general exemplary system summary above may be augmented by the various elements described herein to produce a wide variety of embodiments consistent with this overall design description.

Method Summary

An exemplary method of the present invention covers a wide variety of variations in the basic theme of implementation, but can be generalized as a livestock identification method including:
  (1) Capturing animal image data (AID) of a livestock animal using an image capture computer (ICC);
  (2) Transmitting the AID to a livestock web server (LWS) via a Computer Communications Network (CCN);
  (3) Receiving the AID via the LWS and storing the AID in a Livestock Image Database (LID);
  (4) Comparing the AID against an Eigenface Weight Vector (EWV) retrieved from a Livestock Eigenface Database (LED);
  (5) Determining if there is a match of the AID with the EWV, and if not proceeding to the step (1);
  (6) Generating a livestock animal identifier (LAI) based on comparing the AID against the EWV;
  (7) Storing livestock state parameters associated with the LAI in a livestock historical database (LHD);
  (8) Determining the health or harvesting potential of livestock animal associated with the LAI; and
  (9) Generating a report of the health or the harvesting potential and presenting the report through a graphical user interface (GUI) to a user over a web browser.

This general exemplary method may be modified depending on a number of factors, with rearrangement and/or addition/deletion of steps. Integration of this and other exemplary embodiment methods in conjunction with a variety of exemplary embodiment systems described herein is within the overall scope of the present inventions.

System/Method Variations

The present inventions contemplate a wide variety of variations in the basic theme of construction. The examples presented previously do not represent the entire scope of possible usages. They are meant to illustrate a few of the many possibilities within the scope of the inventions.

This basic system and method may be augmented with a variety of ancillary embodiments, including but not limited to:
  An embodiment wherein the CCN comprises the Internet.
  An embodiment wherein the livestock animal is selected from a group consisting of: pigs; hogs; calves; cows; steers; lambs; sheep; lamas; and chickens.
  An embodiment wherein the LHS comprises data selected from a group consisting of: water consumption; food consumption; body weight; body core temperature; and body surface temperature.

An embodiment wherein the LWS is configured to retrieve information associated with the LAI from the LHD and determine the body weight of the livestock animal associated with the LAI by analyzing the AID.

An embodiment wherein the EWV is associated with the feature of the livestock animal selected from a group consisting of: face; eyes; ears; skin coloration; body markings; and livestock identification tags.

An embodiment wherein the LWS is configured to determine the health of the livestock animal by analysis of the AID against historical data retrieved from the LHD.

An embodiment wherein the LWS is configured to generate a health alert message to a user via a web browser interface communicating over the CCN if an analysis of the AID against historical data retrieved from the LHD determines that the health of the livestock animal is compromised.

An embodiment wherein the LWS is configured to determine the harvest potential of the livestock animal by analysis of the AID against historical data retrieved from the LHD.

An embodiment wherein the LWS is configured to estimate the body weight of the livestock animal by application of a non-linear curve fitting algorithm to the pixel distance between the eyes of the livestock animal as captured in the AID.

An embodiment wherein the LWS is configured to estimate the body weight of the livestock animal by application of a linear curve fitting algorithm to the pixel distance between the eyes of the livestock animal as captured in the AID.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions within the present inventions can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks, solid state drives, flash drives, and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention. As generally illustrated herein, the present inventions system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. The exemplary embodiments using software are limited to computer readable media wherein the media is both tangible and non-transitory.

CONCLUSION

Exemplary embodiments of a livestock identification system and method configured to identify animals from a pool of livestock have been disclosed. The system/method utilizes images of individual animals and determines the identity of a specific animal based on markers extracted from the image of the animal. These markers may then be used to characterize the state of the animal as to weight, health, and other parameters. The system is configured to log these parameters in a temporal database that may be used to determine historical activity of the animal, including but not limited to activity relating to food and/or fluid intake. This historical record in conjunction with analysis of the animal state parameters is used to determine the animal health status and may also be used to determine whether the animal is ready for harvesting.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A livestock identification method comprising:
   (1) capturing animal image data (AID) of a livestock animal using an image capture computer (ICC);
   (2) transmitting said AID to a livestock web server (LWS);
   (3) storing said AID in a livestock image database (LID);
   (4) comparing said AID against an eigenface weight vector (EWV) retrieved from a livestock eigenface database (LED);
   (5) determining if there is a match of said AID with said EWV, and if not proceeding to said step (1);
   (6) generating a livestock animal identifier (LAI) based on said comparison of said AID against said EWV;
   (7) storing livestock state parameters associated with said LAI in a livestock historical database (LHD);
   (8) determining the health or harvesting potential of livestock animal associated with said LAI; and
   (9) generating a report of said health or said harvesting potential, said report viewable on a graphical user interface (GUI).

2. The livestock identification method of claim 1 wherein said livestock animal is selected from: pigs; hogs; calves; cows; steers; horses, lambs; sheep;
turkeys; ducks; and chickens.

3. The livestock identification method of claim 1 wherein said LHD comprises data relating to: water consumption; food consumption; body weight; appearance; body core temperature; or body surface temperature.

4. The livestock identification method of claim 1 wherein said LWS is configured to retrieve information associated with said LAI from said LHD and determine the body weight of said livestock animal associated with said LAI by analyzing said AID.

5. The livestock identification method of claim 1 wherein said EWV is associated with the feature of said livestock animal selected from a group consisting of: face; eyes; ears; snout; mouth; skin coloration; body markings; and livestock identification tags.

6. The livestock identification method of claim 1 wherein said LWS is configured to determine the health of said livestock animal by analysis of said AID against historical data retrieved from said LHD.

7. The livestock identification method of claim 1 wherein said LWS is configured to generate a health alert if an analysis of said AID against historical data retrieved from said LHD determines that the health of said livestock animal is compromised.

8. The livestock identification method of claim 1 wherein said LWS is configured to determine the harvest potential of said livestock animal by analysis of said AID against historical data retrieved from said LHD.

9. The livestock identification method of claim 1 wherein said LWS is configured to estimate the body weight of said livestock animal by application of a non-linear curve fitting algorithm to the pixel distance between the eyes of said livestock animal as captured in said AID.

10. The livestock identification method of claim 1 wherein said LWS is configured to estimate the body weight of said livestock animal by application of a linear curve fitting algorithm to the pixel distance between the eyes of said livestock animal as captured in said AID.

11. The livestock identification method of claim 1 wherein the livestock animal is a pig or hog.

12. The livestock identification method of claim 1 wherein the livestock animal is a cow or steer.

13. The livestock identification method of claim 1 wherein the livestock animal is a lamb or sheep.

14. A tangible non-transitory computer usable medium having computer-readable program code means embodied thereon comprising a livestock identification method comprising:
(1) capturing electronic animal image data (AID) of a livestock animal;
(2) transmitting said AID to a livestock web server (LWS);
(3) receiving said AID via said LWS and storing said AID in a livestock image database (LID);
(4) comparing said AID against an eigenface weight vector (EWV) retrieved from a livestock eigenface database (LED);
(5) determining if there is a match of said AID with said EWV, and if not proceeding to said step (1);
(6) generating a livestock animal identifier (LAI) based on said comparison of said AID against said EWV;
(7) storing livestock state parameters associated with said LAI in a livestock historical database (LHD);
(8) determining the health or harvesting potential of livestock animal associated with said LAI; and
(9) generating a report of said health or said harvesting potential, said report viewable on a graphical user interface (GUI).

15. The computer usable medium of claim 14 wherein said LHD comprises data relating to: water consumption; food consumption; body weight; appearance; body core temperature; or body surface temperature.

16. The computer usable medium of claim 14 wherein said LWS is configured to retrieve information associated with said LAI from said LHD and determine the body weight of said livestock animal associated with said LAI by analyzing said AID.

17. The computer usable medium of claim 14 wherein said EWV is associated with the feature of said livestock animal selected from: face; eyes; ears; snout; mouth; skin coloration; body markings; and livestock identification tags.

18. The computer usable medium of claim 14 wherein said LWS is configured to determine the health of said livestock animal by analysis of said AID against historical data retrieved from said LHD.

19. The computer usable medium of claim 14 wherein said LWS is configured to generate a health alert if an analysis of said AID against historical data retrieved from said LHD determines that the health of said livestock animal is compromised.

20. The computer usable medium of claim 14 wherein said LWS is configured to determine the harvest potential of said livestock animal by analysis of said AID against historical data retrieved from said LHD.

21. The computer usable medium of claim 14 wherein said LWS is configured to estimate the body weight of said livestock animal by application of a non-linear curve fitting algorithm to the pixel distance between the eyes of said livestock animal as captured in said AID.

22. The computer usable medium of claim 14 wherein said LWS is configured to estimate the body weight of said livestock animal by application of a linear curve fitting algorithm to the pixel distance between the eyes of said livestock animal as captured in said AID.

23. A livestock animal health and weight estimation method comprising:
(1) capturing animal image data (AID) of a livestock animal comprising a visible or spatial characteristic of a livestock animal by using an image capture computer (ICC);
(2) comparing said AID against an eigenface weight vector (EWV) retrieved from a livestock eigenface database (LED), wherein the LED includes an eigenface weight vector of the livestock animal;
(3) determining if there is a match between said AID and said EWV, and if so proceeding to said step (4);
(4) retrieving a livestock animal identifier (LAI) from said LED based on said match;
(5) updating livestock status parameters associated with said LAI in said LED;
(6) determining the health and harvesting potential (HHP) of the livestock animal associated with said LAI; and
(7) generating a report of said HHP to a graphical user interface (GUI) presented to a user over a web browser.

24. The livestock identification method of claim 23 wherein the livestock animal is a pig or hog.

25. The livestock identification method of claim 23 wherein the livestock animal is a cow or steer.

26. The livestock identification method of claim 23 wherein the livestock animal is a lamb or sheep.

* * * * *